US009916846B2

(12) United States Patent
Lassche et al.

(10) Patent No.: US 9,916,846 B2
(45) Date of Patent: Mar. 13, 2018

(54) METHOD AND SYSTEM FOR SPEECH DETECTION

(71) Applicant: NICE-SYSTEMS LTD., Ra'anana (IL)

(72) Inventors: Frits Lassche, Schoorl (NL); Ivar Meijer, Heerhugowaard (NL); Victor Bastiaan Mosch, De Rijp (NL); Steven St. John Logan, Kingsley (GB); Jurgen Willem Wessel, Alkmaar (NL); Gerardus B. J. Stam, Waarland (NL)

(73) Assignee: NICE LTD., Ra'anana (IL)

(*) Notice: Subject to any disclaimer, the term of this patent is extended or adjusted under 35 U.S.C. 154(b) by 0 days.

(21) Appl. No.: 14/617,942

(22) Filed: Feb. 10, 2015

(65) Prior Publication Data

US 2016/0232923 A1 Aug. 11, 2016

(51) Int. Cl.

| | |
|---|---|
| ***G10L 25/93*** | (2013.01) |
| ***G10L 15/02*** | (2006.01) |
| ***G10L 15/04*** | (2013.01) |
| ***G10L 25/84*** | (2013.01) |
| *G10L 25/78* | (2013.01) |

(52) U.S. Cl.
CPC .............. *G10L 25/84* (2013.01); *G10L 25/78* (2013.01); *G10L 2025/783* (2013.01)

(58) Field of Classification Search
CPC ......... G10L 25/78; G10L 15/02; G10L 15/20; G10L 15/22; G10L 21/02; G10L 25/93; G10L 15/04; G10L 15/26; G10L 25/87; G10L 19/04; G10L 21/0364; G10L 21/0208; G10L 15/063
USPC ......... 704/200, 231–235, 208–209, 260, 275
See application file for complete search history.

(56) References Cited

U.S. PATENT DOCUMENTS

| | | | | |
|---|---|---|---|---|
| 2002/0038211 | A1* | 3/2002 | Rajan | G10L 25/78 704/233 |
| 2008/0127244 | A1* | 5/2008 | Zhang | H04N 5/147 725/32 |
| 2010/0332237 | A1* | 12/2010 | Takeuchi | G10L 21/0364 704/278 |
| 2013/0132078 | A1* | 5/2013 | Arakawa | G10L 25/78 704/233 |
| 2014/0336448 | A1* | 11/2014 | Banna | A61N 1/36032 600/25 |
| 2014/0358264 | A1* | 12/2014 | Long | G10H 1/0058 700/94 |

* cited by examiner

*Primary Examiner* — Feng Niu
*Assistant Examiner* — Stephen Brinich
(74) *Attorney, Agent, or Firm* — Pearl Cohen Zedek Latzer Baratz LLP

(57) ABSTRACT

A system and method for determining an amount of speech in an audio signal may include for example: obtaining segments of the audio signal, wherein the segments are grouped into blocks; for each one of the segments, calculating a segment value indicative of an amplitude of the audio signal of a respective segment; for each one of the blocks calculating a block value indicative of the amplitude of the audio signal of a respective block; and calculating an audio signal speech grade based on segment values and block values, wherein the audio signal speech grade is indicative of the amount of speech in the audio signal.

22 Claims, 16 Drawing Sheets

METHOD AND SYSTEM FOR SPEECH DETECTION

FIELD OF THE INVENTION

The invention relates to a method for determining an amount of speech in an audio signal. In particular, the invention relates to a method for determining an amount of speech in an audio signal based on dynamic behavior of the audio signal and on the ratio between high and low volume parts.

BACKGROUND

Detecting the presence of speech in audio recording is useful for a variety of applications such as recording systems, Voice over Internet Protocol (VoIP) applications, speech-to-text applications and others. For example, a speech detection mechanism may be used in recording systems to avoid recording and archiving silent audio streams and to alert users if speech is not present in a recording. In VoIP applications, detection of human speech may help avoid unnecessary processing and transmission of silent packets. Speech-to-text algorithms are usually very processing-intensive, so when the speech detector determines that there is no speech in a recording, it omits the need for transcription. This may save a lot of unnecessary processing.

Detecting the presence of speech in audio recording is particularly important for a recording system that needs to provide a proof that all conversations are recorded, based on regulations for compliancy. On trading floors, recording functionality has the highest priority because trading is not allowed when the recording functionality has failed or has been compromised. Absent the ability to detect presence of speech, systems may be recording noise or silence unknowingly, and therefore break compliancy regulations without informing the user.

Current speech detection algorithms are either not accurate or require complex analysis of the audio signal. Speech detection algorithms that require relatively low computational power are not very flexible or fault-tolerant. These algorithms may be sensitive to the audio quality. Changes in noise level, bandwidth, DC offset (e.g., changes in the mean value of the audio signal), dynamic range, clipping and distortion may affect speech detection results. These algorithms may only provide a Boolean output, either speech is present or not, without giving indication for the amount of speech in the audio stream. On the other hand, the more accurate and robust algorithms are computationally intensive since they require complex frequency analysis, phonetic comparison, or other computationally intensive calculations.

Thus, current accurate speech detection algorithms are typically very computational intensive, which may limit their wide implementation in systems that have limited computing power. For example, recording systems may be required to analyze and record thousands of channels concurrently. Thus, either the detection mechanism cannot be executed in real-time with the audio stream recording, or when in use, it strongly reduces the amount of possible concurrent recordings.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
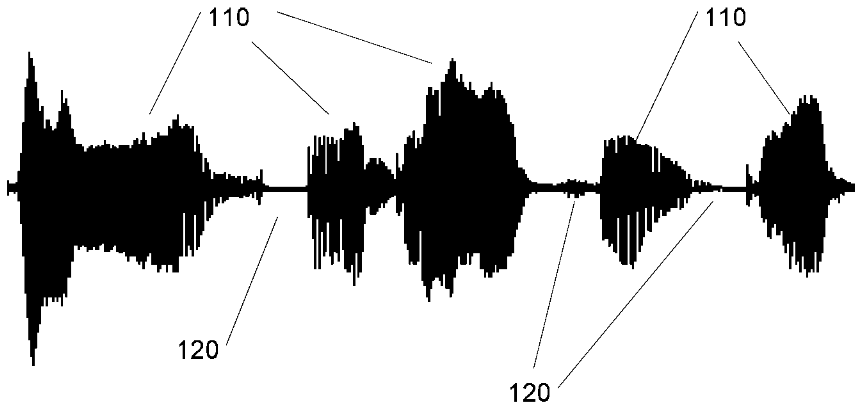
FIG. 1 is a speech waveform illustration helpful in understanding embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the present invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the present invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

Regular speech, in any language, includes sections of both voice activity and silence, due to a natural breathing pattern. Audio signals that include speech will always contain volume changes, referred to herein as dynamics. Reference is now made to FIG. 1, which depicts an exemplary speech waveform having high volume parts 110 and low volume parts 120 that follow each other constantly. Typical speech contains about as much high volume parts as low volume parts. Determining the amount of speech in an audio signal according to embodiments of the invention may rely on this behavior. As used herein the amount of speech may refer for example to the percentage of time of the audio signal or stream devoted to speech, the proportion or number of blocks out of a total of blocks devoted to speech, etc. Other measures may be used. Embodiments of the invention may detect speech using estimations of both the amount of dynamic behavior and the ratio between high and low volume parts. The processing of an audio stream may generate a number, in one embodiment referred to as the audio signal speech grade or rating, that number is an estimation of the fraction or percentage of time of the audio signal that contains the dynamic behavior of speech. Embodiments of the invention include mechanisms for distinguishing between speech patterns and typical patterns of noise or silence.

Figure 2:
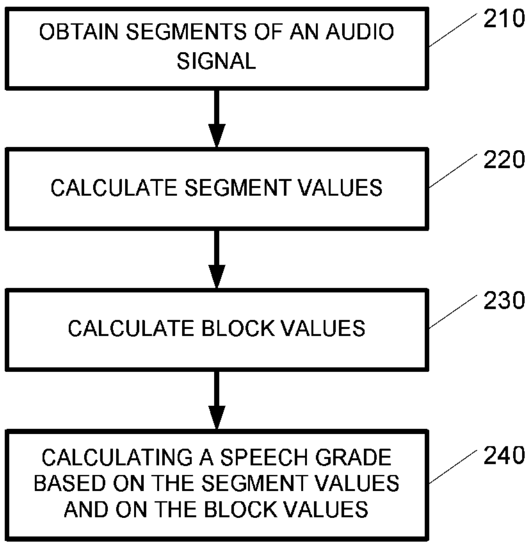
FIG. 2 is a flowchart illustration of a method for determining an amount of speech in an audio signal according to embodiments of the invention.

Reference is now made to FIG. 2, which is a flowchart illustration of a method for determining an amount of speech in an audio signal according to some embodiments of the invention. In operation 210, the method may include obtaining segments of an audio signal.

As used herein an audio signal or audio stream may refer to a representation, e.g., a digital representation, of sound in any applicable format in which the level of the audio signal is representative of the amplitude or volume level of the sound. For example, audio samples of the audio signal may be signed pulse control modulation (PCM) encoded. The audio signal is typically uncompressed. If a compressed audio signal is received, the compressed audio signal may undergo a preliminary stage of decompression before being analyzed. The audio signal may be time-divided into segments, blocks and optionally into parts. In one embodiment a segment may include 5-40 milliseconds of audio, blocks may include 40-60 segments and a part may include about 900 blocks. Other time lengths, and other methods of dividing a signal, may be used. For example, in a sampling rate of 8 kHz (8000 samples per second), typical to voice recording systems and many voice over Internet protocol (VoIP) applications, a segment may include 40-420 samples, a block may include 0.2-2.4 seconds and a part may include 3-36 minutes of audio. Other sampling rates may be used.

In operation 220, segment values may be calculated. The segment values may be indicative of the amplitude of the audio signal during the segment. For example, segment values may be calculated by averaging an absolute value of the audio signal over the segment duration (as with other equations shown herein, other or different equations may be used in other embodiments of the invention):

$$SegmentAverage = \frac{\sum_{i=1}^{SegmentSize} |\text{sample}(i)|}{SegmentSize} \quad \text{(Equation 1)}$$

where SegmentAverage is the segment value, SegmentSize is the number of samples in the segment, sample(i) is the amplitude or value of the audio signal for sample i, where, $i \in \{1, 2, \ldots, \text{SegmentSize}\}$ According to embodiments of the invention, other alternatives to calculating segment values may include averaging peak to peak amplitude of the audio signal over the segment, finding the peak amplitude which is the maximum absolute value of the audio signal over the segment, and calculating the Root Mean Square (RMS) amplitude which is the square root of the mean over time of the square of the value of the audio signal over the segment.

In operation 230, block values are calculated. The block values are indicative of the amplitude of the audio signal associated with the block For example, block values may be calculated by averaging the segment values of the block:

$$BlockValue = \frac{\sum_{i=1}^{BlockSize} SegmentAverage(i)}{BlockSize} \quad \text{(Equation 2)}$$

It should be readily understood that for each of the above methods for calculating segment values, and unless the block contains complete silence, the block value is expected to have some positive value.

In operation 240, an audio signal speech grade may be calculated. The audio signal speech grade may be calculated based on the segment values and on the block values, as explained in detail herein. The audio signal speech grade may be indicative of the amount of speech in the audio stream.

Figure 3:
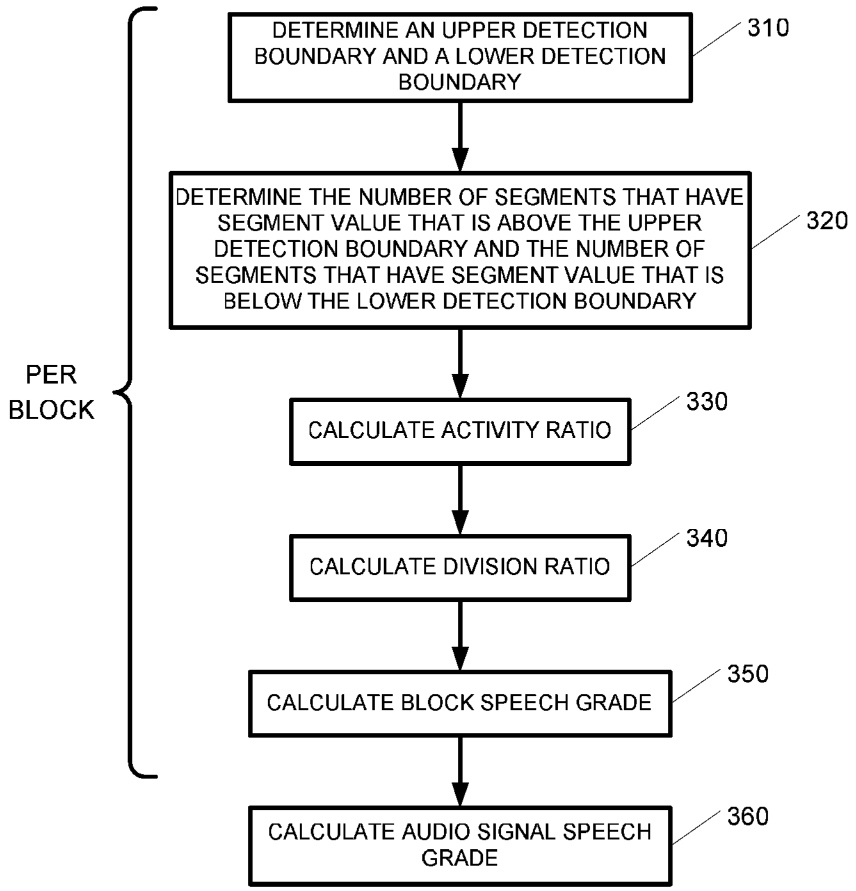
FIG. 3 is a flowchart illustration of a method for calculating the audio signal speech grade according to embodiments of the invention.
Figure 4:
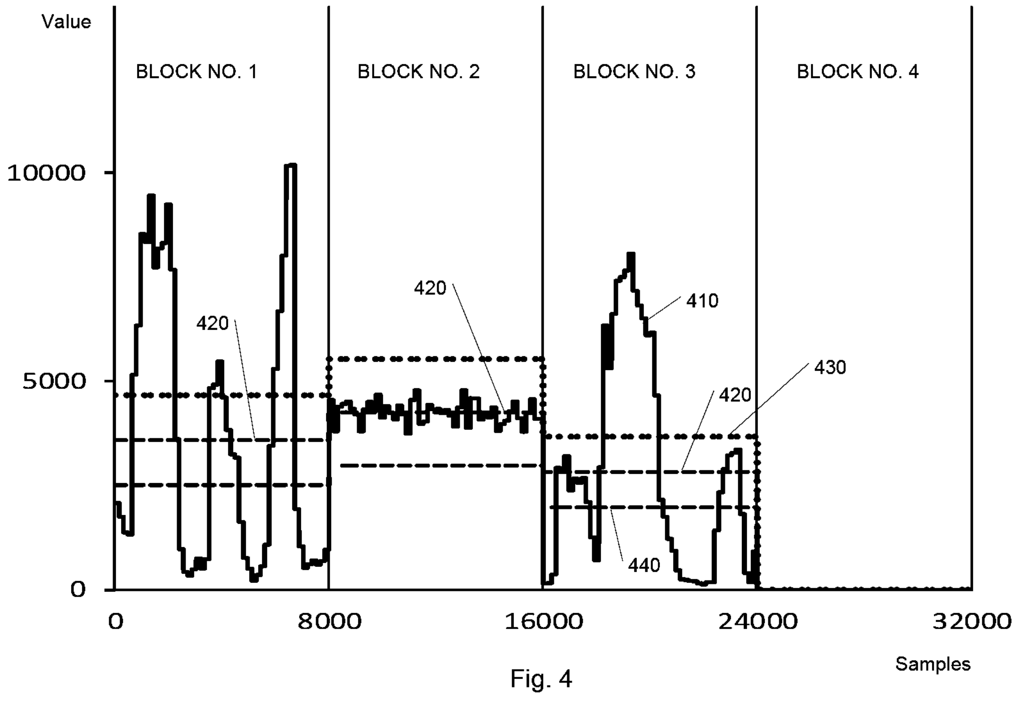
FIG. 4 depicts segment values and block values of an exemplary audio signal according to embodiments of the invention.

Reference is now made to FIG. 3, which is a flowchart illustration of a method for calculating the audio signal speech grade according to some embodiments of the invention and additionally to FIG. 4, which depicts segment values and block values of an exemplary audio signal. The audio signal depicted in FIG. 4 includes four blocks: blocks No. 1 and 3 include speech, block No. 2 includes noise, and block No. 4 includes silence. Graph 410 represents the segment values of the audio signal in blocks No. 1-3 and dashed lines 420 represents the block values.

The sampling rate of the audio signal represented in FIG. 4 is 8 KHz, each segment includes 160 samples and each block includes 50 segments or 8000 samples. The segment values and block value 420 are calculated according to equations 1 and 2, respectively. Other numbers of segments and lengths may be used. The example method for calculating the audio signal speech grade presented in FIG. 3 is an elaboration of operation 240 of FIG. 2.

In operation 310, the method may include determining, for each analyzed block, an upper detection boundary, for example, upper detection boundary 430 of block No. 3 and a lower detection boundary, for example, lower detection boundary 440 of block No. 3 relative to the block value 420 of block No. 3. Upper detection boundary may be above the block value 420 and lower detection boundary may be below the block value 420. According to embodiments of the invention, upper detection boundary and lower detection boundary may be determined by multiplying block value 420 by a single parameter, variation, and adding or subtracting it from the block value according to:

$$\text{upper detection boundary} = \text{block value} + \text{block value} \cdot \text{variation}$$

$$\text{lower detection boundary} = \text{block value} - \text{block value} \cdot \text{variation} \quad \text{(Equation 3)}$$

By defining upper and lower detection boundaries as being relative to block value 420, the mechanism may become substantially volume independent since upper and lower detection boundaries change with the amplitude of the audio signal or the volume level (e.g., degree of loudness).

According to embodiments of the invention, upper detection boundary and lower detection boundary may be determined differently, for example, by adding/subtracting a predetermined value to/from block value 420. In some embodiments, a different value of variation may be set for the calculation of upper detection boundary and lower detection boundary.

In operation 320, the segments that have a segment value above upper detection boundary 430 and the segments that have a segment value below lower detection boundary 440 are counted and their number is determined The number of segments that have a segment value above upper detection boundary 430 is denoted as HighSegments, and the segments that have segment value below lower detection boundary 440 is denoted as LowSegments. The segments that have a segment value that is either above upper detection boundary 430 or below lower detection boundary 440 may be referred to herein as dynamic segments.

As noted before, regular speech includes both voice activity and silence periods. The voice and silence periods are evident in blocks no. 1 and 3 of FIG. 4, which contain speech. Segments that are part of voice periods may have segment values above block value 420 and segments that are part of silent periods may have segment values that are below block value 420. Typically, a block duration is determined to include at least one voice period and silence period, and preferably a plurality of voice periods and silence periods. In case of total silence, as illustrated in block no. 4, both the segment values and the block value equal zero. This is seldom the case in real-life recordings due to noise. Block no. 2 represents a recording of noise. It can be seen that here also, some of the segment values represented by graph 410 are above block value 420 and some are below. Counting segments values that are above upper detection boundary 430 and below lower detection boundary 440 may help to distinguish between speech and noise. If upper detection boundary 430 and lower detection boundary 440 are determined properly, segments that contain only noise will have segment values that are below upper detection boundary 430 and above lower detection boundary 440, and therefore will not be counted. In operation 330, the activity ratio may be calculated. The activity ratio may be calculated according to:

$$\text{activity ratio} = \frac{LowSegments + HighSegments}{\text{total amount of segments in the block}} \quad \text{(Equation 4)}$$

The activity ratio is the fraction of the number of dynamic segments from the total amount of segments of a block. The activity ratio is in direct proportion with the number of dynamic segments. Thus, as the number of dynamic segments increases, the activity ratio increases.

In operation 340, the division ratio may be calculated. The division ratio may be calculated according to for example:

$$Division\ ratio = 1 - \frac{|HighSegments - LowSegments|}{HighSegments + LowSegments} \quad \text{(Equation 5)}$$

The division ratio reaches a maximal value of 1, if HighSegments equals LowSegments, and decreases as the difference between HighSegments and LowSegments increases.

In operation 350, a block speech grade may be calculated. The block speech grade of a block may be proportional to the activity ratio times the division ratio of the respective block Thus the block speech grade may be calculated according to for example:

$$\text{Block speech grade} = \text{activity ratio} * \text{Division ratio} * \text{proportion factor} \quad \text{(Equation 6)}$$

According to embodiments of the invention, the proportion factor may be set so that blocks that contain speech over the entire block duration would get a block speech grade that is equal to or above a certain predetermined number (e.g., 100), while the speech grade of blocks that contain some speech and some silence would typically get lower speech grades. The block speech grade of blocks that contain complete silence would typically be zero. If the values of the upper and lower detection boundaries are set properly, the block speech grades of blocks that contain only noise would be zero as well. Based on empirical calculations, a range of block speech grades for blocks that contain speech over the entire block duration can be determined According to embodiments of the invention, a cutoff value may be determined to equal a substantially minimal value of that range. According to some embodiments, the minimal value of the range may be calibrated to equal a desired value, e.g., 100, using the proportion factor. According to embodiments of the invention, block speech grades of all blocks that get a block speech grade that is equal or is above the cutoff value may be set to the cutoff value.

As indicated above, the block speech grades calculation for blocks that contain both speech periods and silence periods would typically results in a number between zero and the cutoff value. However, the block speech grades calculation for blocks with a low quality voice recording, e.g, blocks with a low Signal to Noise Ratio (SNR), would also typically result in block speech grades that are above zero and below the cutoff value. Depending on the setting of variation parameter, the amount of dynamic segments within a block that contains speech and noise is expected to be significantly lower than a block containing the same amount of speech without noise (or with a much higher SNR or amplitude).

The probability of being able to understand what was actually said in a block with low SNR is lower than a block with high SNR, so the block grade may also be indicative of the quality or usefulness of the speech within a block Thus, block speech grades that are above zero and below the cutoff value may indicate either that a block contains speech periods and silence periods or that a block contains low quality (low SNR) speech recording. An audio signal that contains a large percentage of blocks that have block speech grades that are above zero and below the cutoff value may be suspicious of having low quality recording.

In operation 360, the audio signal speech grade may be calculated. The audio signal speech grade may be calculated for example by averaging the block speech grades. Setting the cutoff value to 100 is convenient since after averaging as explained below, the audio signal speech grade may range from 0 to 100 and may interpreted as an approximation of the percentage of the audio signal that contains speech. Thus, an audio signal speech grade of "100" would indicate that the audio sample includes speech over its entire duration while an audio signal speech grade of "0" would indicate that the audio sample does not include any speech. Alternatively, the audio signal speech grade may be calculated by comparing the block speech grades to a predetermined threshold level, counting the number of blocks with block speech grade that is above the threshold and dividing the number of blocks with block speech grade that is above the threshold by the total number of blocks.

According to some embodiments of the invention, a marker may be assigned to an audio signal if a block speech grade of at least one block of the audio signal is above a predetermined threshold. The marker may indicate that the audio signal includes some speech although due to averaging, the audio signal speech grade may be relatively low. For example, marker may be a predetermined minimum value given to the audio signal speech grade. This may help differentiating between completely silent audio signals and audio signals with little speech, or speech over a short duration. The minimum value may be assigned to the audio signal speech grade when the audio signal speech grade is lower than the minimum value and at least one block of the audio signal is higher than or equal to the predetermined threshold.

According to embodiments of the invention, an indication may be given in case the audio signal contains a large percentage of blocks that have block speech grades that are above zero and below 100, as being suspicious of having low quality recording of speech. As with other thresholds, boundaries and limits discussed herein, different thresholds, boundaries and limits may be used in other embodiments.

Returning to the example presented in FIG. 4, in this case, the proportion factor has been set to 240, the cutoff value to 100 and variation value to 20. The activity ratio, division ratio and block speech grades were calculated according to equation Nos. 4, 5, 6, respectively. The audio signal speech grade has been calculated by averaging the four block speech grades. Table 1 summarizes example calculations of the speech grades (other calculations may be used):

TABLE 1 calculation of speech grades for the audio signal depicted in FIG. 4

| Block # | HighSegments | LowSegments | Activity ratio | Division ratio | Block speech grade | Audio signal speech grade |
|---|---|---|---|---|---|---|
| 1 | 20 | 27 | 0.94 | 0.85 | 100 | |
| 2 | 0 | 0 | 0 | 0 | 0 | |
| 3 | 22 | 23 | 0.9 | 0.98 | 100 | |
| 4 | 0 | 0 | 0 | 0 | 0 | |
| | | | | | | 50 |

Thus, embodiments of the invention relate to a computationally light-weight method that can quantify the amount of speech in an audio signal. The method may distinguish between noise, silence and speech while being amplitude independent and language independent. As known in the art of computers, averaging is a very light-weight operation for a CPU, which enables real-time processing of a large number of audio signals (e.g. over 1000) on a recording system under full load. The audio signal speech grade is a single integer number, allowing easy interpretation and evaluation of the amount of speech per recording.

The audio signal speech grade may be used for a variety of applications. Examples include determining whether to store the audio signal based on the audio signal speech grade, providing an alarm if for a predetermined amount of time of the audio signal speech grade is lower than a predetermined minimum, determining whether to process or analyze the audio signal based on the audio signal speech grade, providing reports (e.g., information in an organized format, to a user) regarding the audio signal speech grade over time, etc. Processing or analyzing the audio signal may include for example performing transcription of the audio signal, performing real time word detection (e.g., using phonetics), compressing the audio signal, encrypting the audio signal, performing emotion analysis, etc. These processes may only be required if the audio signal contains speech and may be performed in the segments (e.g., parts) of the audio signal that contain speech. For example, these processes may only be performed in parts of the audio signal that have speech grade of above a predetermined threshold, as may be determined based on the specific design requirements and application. In some applications, e.g., in systems that record telephone conversations, the speech grade may be used to monitor the performance of the recording system, as described herein.

Figure 5:
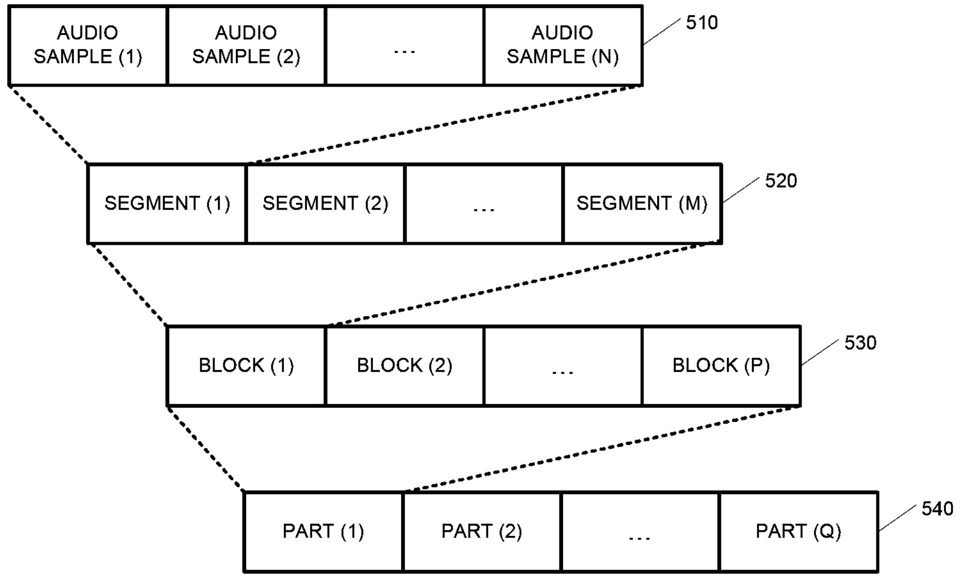
FIG. 5 depicts the relations between samples, segments, blocks and parts of an audio signal according to embodiments of the invention.

As mentioned above, the audio signals may be processed on different levels, for example, segments, blocks and parts. FIG. 5 depicts the relations between segments, blocks and parts of an audio signal, as defined herein. Segments may include N samples, for example, N=160 which may equal to about 20 ms of audio. Blocks includes M segments, for example, M=50 which may equal to about one second (1 s) of audio. Parts may include P blocks, for example, P=900, which may equal to about 15 minutes of audio, and the stream may include Q parts. N, M, P and Q are natural numbers larger than one. The processing is implemented in multiple layers, which enables light-weight processing and low memory usage.

According to embodiments of the invention, after the segment value is calculated, the audio samples that pertain to that segment may be deleted from memory. After the block speech grade of a block is calculated, the segments that pertain to that block may be deleted. After an audio speech grade of a part is calculated, the block speech grades and other parameters of the blocks that pertain to that part may be deleted. This may free memory space. The part level may be introduced to reduce the memory usage by performing an intermediate averaging of block speech grades. When keeping track of all blocks for all streams, which could be 1000 and up, the memory usage may become a problem. This mechanism is designed to be used for processing a large amount of simultaneous streams, while reducing memory usage.

An example of a real-time implementation of the method described above will be given below. It should be readily understood that the real-time implementation described below is non-limiting and other real-time or non-real time implementations of the above-described method are possible. The description below will refer to an audio stream. As used herein, an audio stream is an audio signal that is received or streamed in real-time.

In the following example, the audio sampling rate is 8 KHz. Audio streams are processed on three different levels: segments, blocks and parts, as depicted in FIG. 5. Segments include N=160 samples, which equals 20 milliseconds (ms) of audio. Blocks includes M=50 segments, which equals 1 s of audio. Parts include P=900 blocks, which equals 15 min of audio, and the stream includes any number denoted Q of parts. The processing is implemented in multiple layers, which enables light-weight processing and low memory usage as explained above. The equations in the following example may be interpreted as an assignment of the value of the right hand side expression into the left hand side variable.

Data structures used for processing the audio signal speech grade may include for example (other or different data may be used):

- Segment-record that may contain at least the following information resulted from the processing of audio samples that pertain to a segment:
  - i. Average: The average of absolute values of all the audio samples that pertain to the segment.
  - ii. Maximum: The maximum absolute sample value of all the audio samples pertaining to the segment.
- Block-record that may contain at least the following information resulted from the processing of segments pertaining to the block.
  - i. Grade: The block speech grade.
  - ii. Weight: The fraction of an incomplete block compared to a full block.
- Part-record that contains the average block speech grades of all the blocks pertaining to a part, also referred to as the part speech grade.
- AudioSamples: an array containing all samples of a segment.
- AudioSegments: an array containing all the segment-records that do not form a complete block yet.
- AudioBlocks: Array containing all block-records that do not form a complete part yet.
- AudioParts: Array containing all part-records of a stream.

Figure 6:
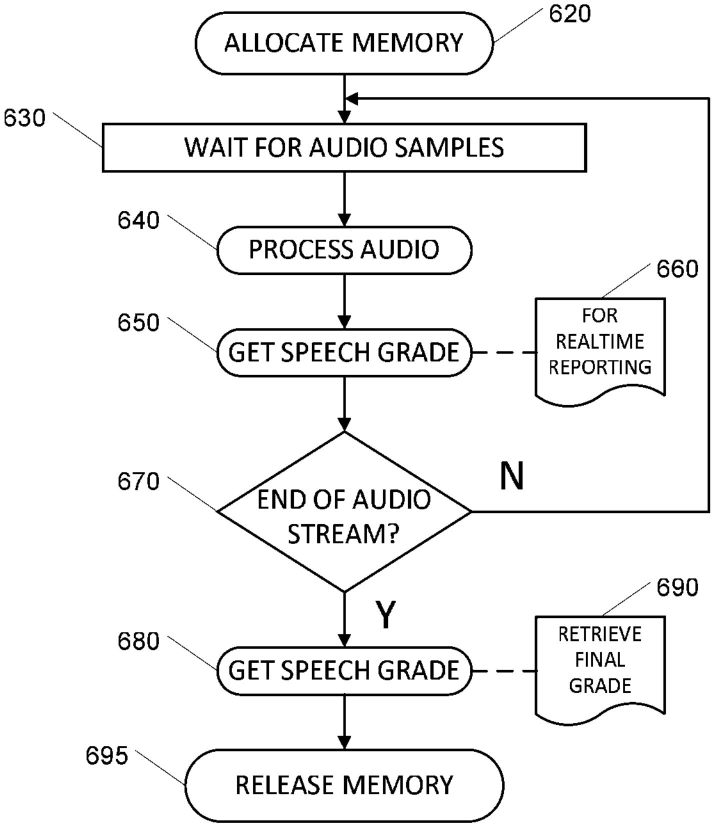
FIG. 6 is a flowchart illustration of a method for determining an amount of speech in an audio steam in real-time according to embodiments of the invention.

Reference is now made to FIG. 6, which is an exemplary flowchart illustration of a method for determining an amount of speech in an audio steam in real-time according to embodiments of the invention. In this example, the handling of an audio stream may be executed in a dedicated process. In operation 620, a memory may be allocated for the data of the stream that needs to be processed. For example, a memory may be allocated for AudioSamples, AudioSegments, AudioBlocks and AudioParts arrays described hereinabove. In operation 630, the process waits for packets containing audio samples. For example, in operation 630 the network may be probed for packets that contain audio samples of the audio stream being processed. In operation 640 the received packet of audio samples may be processed. The audio samples may be stored in an AudioSamples array. Operation 640 will be described with relation to FIG. 7. In operation 650 the speech grade of the audio stream at the moment may be calculated. Operation 650 may be required only in case real-time reporting 660 of the audio steam speech grade in any time is required. Otherwise operations 650 and 660 may be omitted. In operation 670 it is checked whether the audio stream has ended. If not, the process returns to operation 630 and waits for further packets. If the audio stream has ended, than in operation 680 the speech grade of the entire audio stream may be calculated, for example, as a number between 0-100. If the audio speech grade was calculated continuously in operation 650, operation 680 may be omitted since that last value calculated in operation 650 would equal the audio speech grade of the entire stream. Operations 650 and 680 will be described with relation to FIGS. 8A and 8B. In operation 690 the audio signal speech grade of the entire stream may be reported, for example, to a user or to a system that monitors the audio quality for various purposes as disclosed herein.

Figure 7:
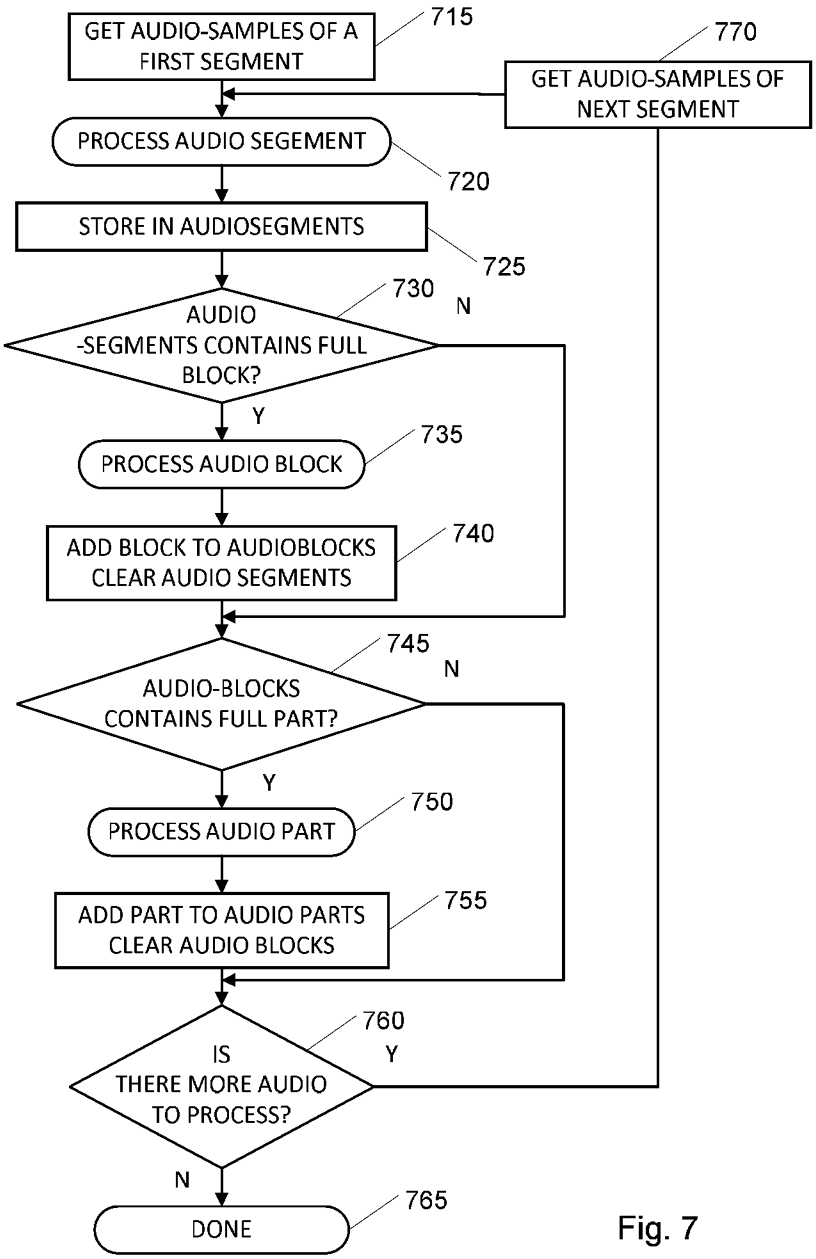
FIG. 7 is a flowchart illustration of a method for audio stream processing according to embodiments of the invention.

Reference is now made to FIG. 7 which is a flowchart illustration of a method for audio stream processing according to embodiments of the invention. The method presented in FIG. 7 may be an elaboration of operation 640 of FIG. 6. In operation 640 audio samples received in operation 630 may be analyzed for presence of dynamic behavior indicating speech and the results are stored in the data structures described hereinabove. The process may also check if there are enough segments to be processed as a block, and if there are enough blocks to be processed as a part.

In operation 715 audio samples of a first segment are obtained. In operation 715 it may be checked whether the packet or packets received in operation 630 include at least one full segment of audio samples and if so, those audio samples are selected for processing. In operation 720 the samples of the complete audio segment are processed and maximum sample value and the sample values, e.g., average sample values may be calculated. Operation 720 will be described in detain with reference to FIG. 9. In operation 725 the results of the processing of operation 720 may be stored in the AudioSegments array. In operation 730 it may be checked whether the AudioSegments array contains a full block If the AudioSegments array contains a full block, then in operation 735 all segments in AudioSegment array may be processed as one block and the block speech grade may be calculated. Operation 735 will be described in detail with reference to FIGS. 10A, 10B and 10C. In operation 740 the results of operation 735 may be stored in the AudioBlocks array and the AudioSegment array may be deleted from memory. If AudioSegments array does not contain a full block in operation 730, then the method may continue to operation 745 or to operation 760.

In operation 745 it may be checked whether AudioBlocks array contains a full part. If AudioBlocks array contains a full part, than in operation 750 all blocks in AudioBlocks array may be processed as one part and the audio speech grade of the part may be calculated. Operation 750 will be described in detail with reference to FIG. 11. In operation 755 the results of operation 750 may be stored in the AudioParts array and the AudioBlocks array may be deleted from the memory. If AudioBlocks array does not contain a full part in operation 745, the method may continue to operation 760. In operation 760 it may be checked whether there is more audio segments to process, e.g., whether there are enough audio samples left in the packet or packets received in operation 630 to construct another segment. In operation 770 the audio samples for the next segment to be processed are obtained. In operation 765 the process terminates when there are no more audio segments to process.

Figure 8A:
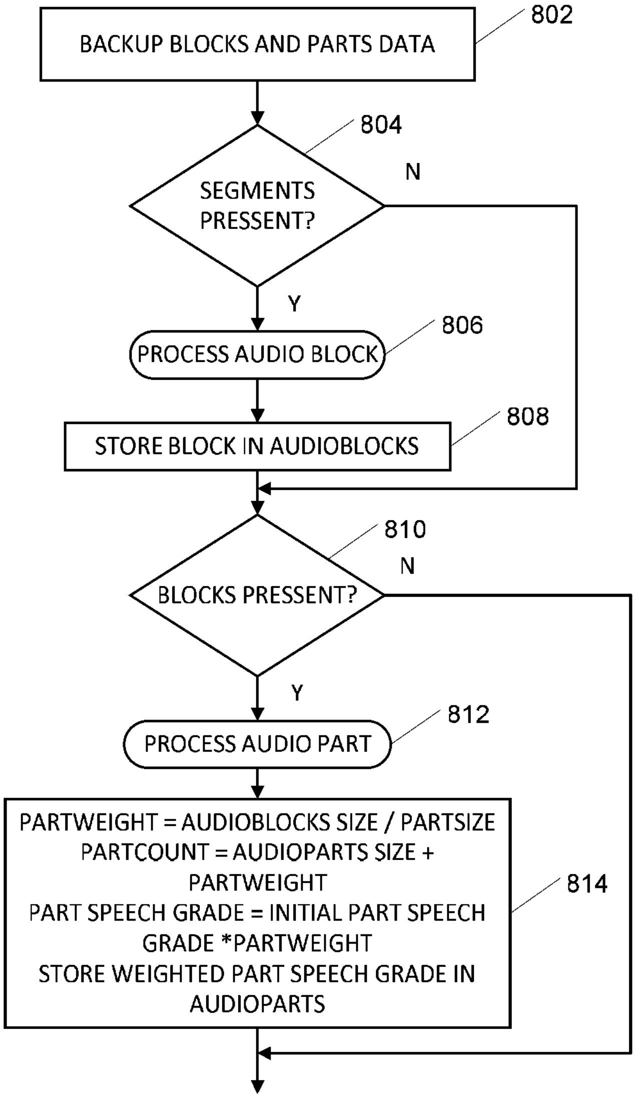
FIGS. 8A and 8B include a flowchart illustration of a method for calculating the speech grade of the audio stream according to embodiments of the invention.
Figure 8B:
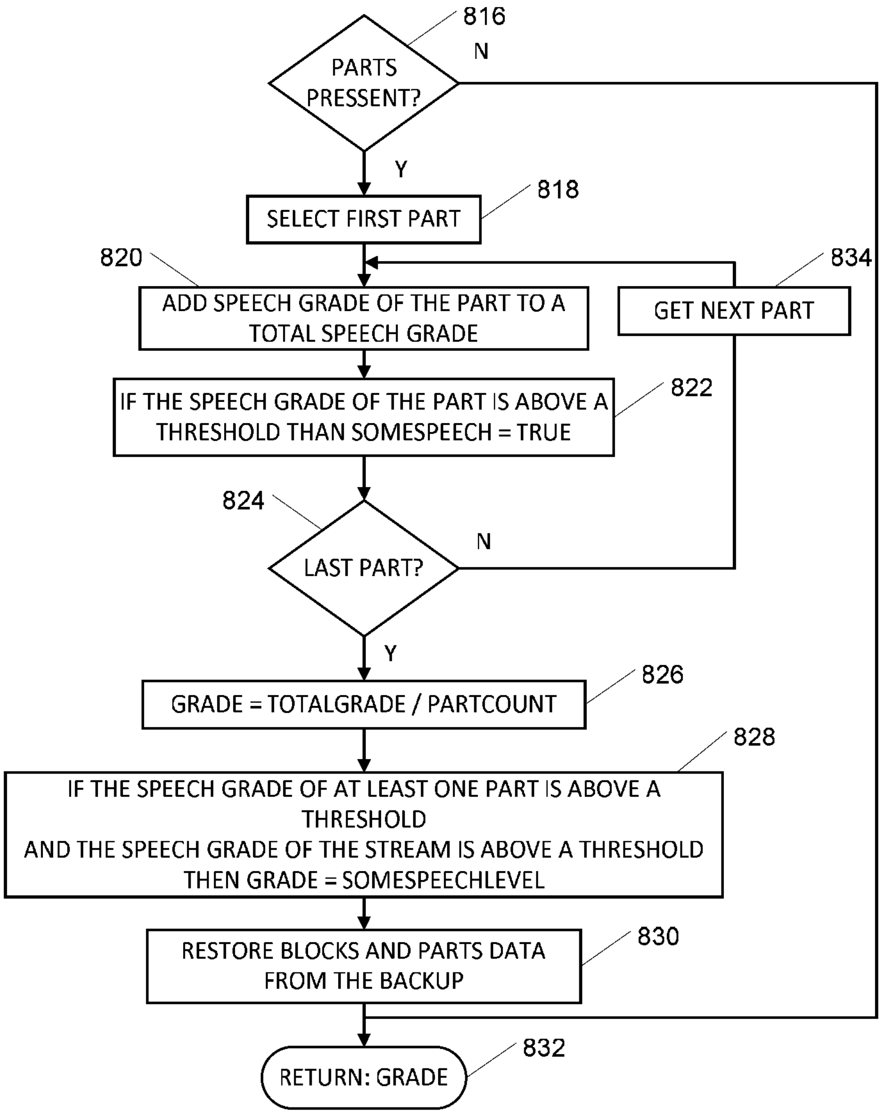

Reference is now made to FIGS. 8A and 8B which is a flowchart illustration of a method for calculating the speech grade of the audio stream according to embodiments of the invention. In the implementation presented in FIGS. 8A and 8B substantially all information, e.g., the information stored in segment, block and part arrays, is being used to determine the audio stream speech grade in a specific moment in time, without changing the data structure. Therefore, repeating this method without adding audio data will result in the same speech grade. The speech grade of the audio stream may be determined by calculating the average of all the parts speech grades stored in the AudioParts array. The method presented hereinbelow considers full parts and blocks as well as partial parts and blocks. Blocks that pertain to the stream but do not constitute a full part, and even segments that don't constitute a full block are being analyzed as well.

Segments that don't form a full Block may be processed as a block, however the result may be weighted according to the fraction these segments constitute of a full Block. Blocks that don't form a full part may be processed as a part. Again the result may be weighted according to the fraction these blocks constitute of a full part for the calculation of the audio signal speech grade. Because the mechanism described above adjusts the internal data structure, a backup may be made which may be deleted at the end.

The method described below ensures a minimum value to the speech grade when at some point in the audio stream high dynamics (a high probability that there was speech) are present. This helps differentiating between completely silent streams and streams with little speech. The minimum value is assigned when the audio stream speech grade is lower than a predetermined threshold and at least one part of the stream is higher or equal than the predetermined threshold.

In operation 802 a backup of the AudioBlocks and AudioParts arrays may be created so AudioBlocks and AudioParts arrays may be adjusted without losing the original data. In operation 804 it is checked whether the AudioSegments array contains any segments. If the AudioSegments array contains any segments, then in operation 806 the segments in AudioSegments array may be processed as a block even if they don't form a full block. This operation may consider the amount of segments and weight the block grade accordingly. Operation 806 will described with relation to FIGS. 10A, 10B and 10C. In operation 808 the results of the processing of operation 806 may be stored in the AudioBlocks array. If AudioSegments array does not contain any segments in operation 804, the method may continue to operation 810 directly. In operation 810 it may checked whether AudioBlocks array contains any blocks. If AudioBlocks array contains at least one block, then in operation 812 the blocks in AudioBlocks array may be processed as a part even if they don't form a full part. Operation 812 will described with relation to FIG. 11. Processing the blocks in AudioBlocks may include calculating a speech grade for these blocks as if they constitute a complete part. Since the processing of parts as described herein with relation to FIG. 11 does not weight the audio speech grade of the part, weighting the audio speech grade of the partial part that was calculated in operation 812 may be performed in operation 814 by dividing the amount of full blocks in the AudioBlocks array (AudioBlocks size) by the amount of Blocks that makes up a full Part (PARTSIZE):

PartWeight=AudioBlocks size/PARTSIZE (Equation 7)

In the following equation, the total amount of parts (PartCount), including full parts (AudioParts size) and partial parts is calculated:

PartCount=AudioParts size+PartWeight (Equation 8)

According to embodiments of the invention the weighted speech grade of a partial part (part speech grade) may equal the speech grade of the partial part calculated in operation 812 (initial part speach grade) multiplied by the weight of the part (PartWeight):

part speech grade=initial part speach grade*PartWeight (Equation 9)

The weighted speech grade of a partial part may be stored in the AudioParts array.

In operation 816 it may checked whether AudioParts array contains any part speech grade. If AudioBlocks array does not contain at least one part speech grade, the method may proceed to operation 832. If AudioBlocks array contains at least one part speech grade, then in operation 818 a first part speech grade may be selected for processing. In operation 820 a speech grade of the entire audio stream may be calculated by adding, in each iteration, the speech grade of a corresponding part:

current total speech grade=total speech grade of last iteration+part speech grade (Equation 10)

In operation 822 it is checked whether the speech grade of the part is above a predetermined threshold. If the speech grade of the part is above that predetermined threshold than a marker (Some Speech) is assigned to the audio stream.

In operation 824 it may checked whether all the part speech grades in AudioParts array have been analyzed in operations 820 and 824. If not, the method proceeds to operation 834 to receive another part speech grade. If all the part speech grades in AudioParts array have been analyzed, then the method proceeds to operation 826 in which the speech grade of the audio stream (grade) is calculated by dividing the total speech grade (current total speech grade) by the total amount of parts (PartCount):

grade=current total speech grade/PartCount (Equation 11)

In operation 828 a predetermined minimum value (SOMESPEECHLEVEL) may be given to the audio signal speech grade if the speech grade of at least one part of the stream is above a predetermined threshold as checked in operation 822, and the speech grade of the entire audio stream is below a second predetermined threshold. The first and second thresholds may be equal or different.

In operation 830, AudioBlocks and AudioParts arrays may be restored from the backup prepared in operation 802. In operation 832 the method terminates and returns the speech grade of the audio stream.

Figure 9:
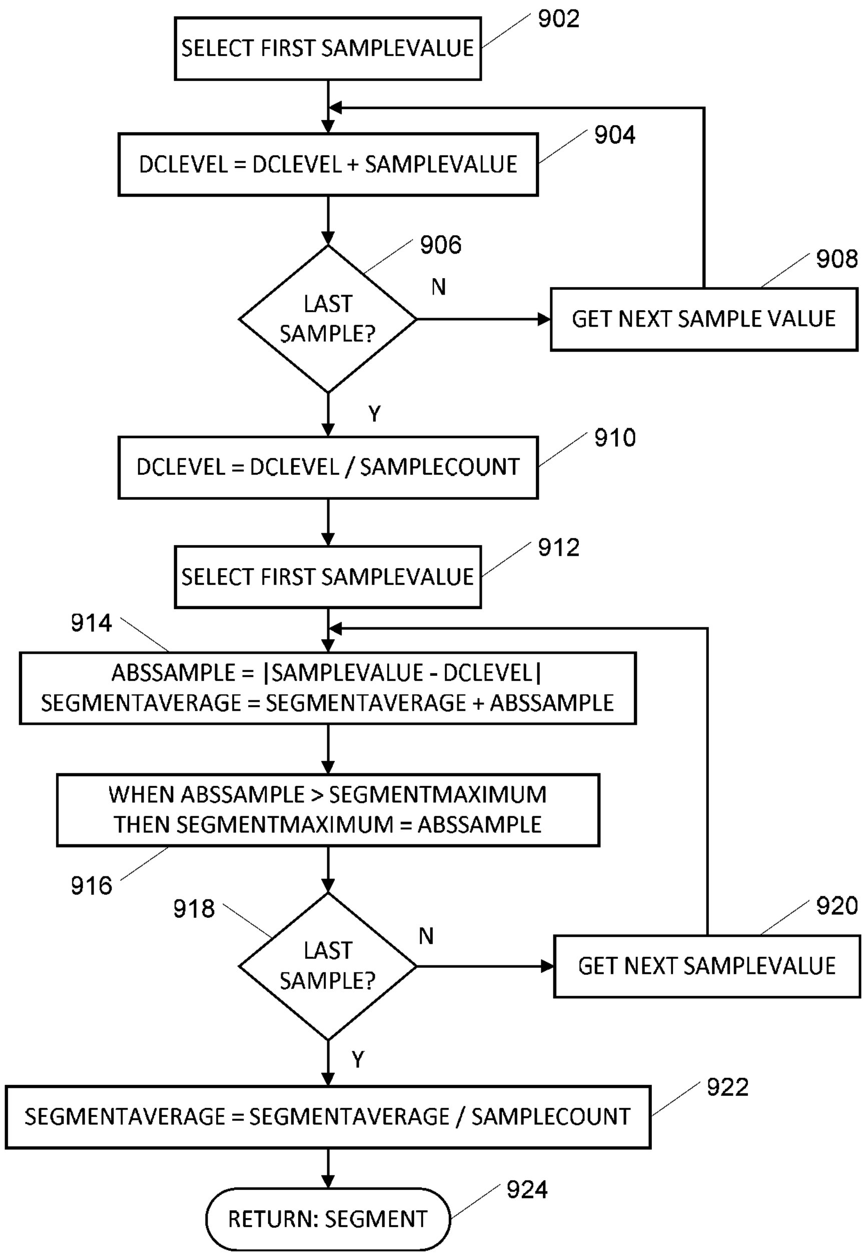
FIG. 9 is a flowchart illustration of method for processing an audio segment according to embodiments of the invention.

Reference is now made to FIG. 9, which is a flowchart illustration of method for processing an audio segment according to some embodiments of the invention. The method for processing an audio segment is an elaboration of operation 720 in FIG. 7. The method may process a fixed amount of audio samples that constitute a single segment.

To properly calculate audio signal speech grade according to embodiments of the invention the original audio signal should have an average value of zero. An average value of the audio signal that does not equal zero may be referred to herein as a DC level of the audio signal or some of the signal (e.g., segment, block, part etc.). The method may determine the DC level of the audio samples of the segment being processed. If a DC level is present this may disrupt the further analytics, so the audio samples may be compensated with the DC level. The method may determine the absolute maximum sample value (negative samples are made positive). This may be used for level triggering, which may enable ruling out background noise. The method may further determine the segment value, e.g., the absolute (negative samples are made positive) average sample value. This may be used for determining the speech grade of the block.

In a first loop of the method (operations 904, 906 and 908), the audio samples are iterated or scanned to determine the DC level of the segment. In a second loop (operations 914, 916, 918 and 920) the audio samples may be compensated with the DC level, so the maximum and average values of the segment may be determined.

In operation 902 a first audio sample may be selected for processing. In operation 904 DC level is calculated by:

$$DcLevel=DcLevel+AudioSample \quad \text{(Equation 12)}$$

Where DcLevel of the left hand side of equation 12 is the current DC level, DcLevel of the right hand side of equation 12 is the DC level of the previous iteration and AudioSample is the value of the audio sample. In operation 906 it is checked whether the iteration through all the samples has finished, e.g., whether it is the last sample of the segment. If not, the next sample is retrieved in operation 908 to continue iteration in operation 904 through all Audio Samples of the segment. If there are no more samples in the segment, the method proceeds to operation 910. In operation 910 the DC level per audio sample (DcLevel of the left hand side of equation 13) may be calculated by dividing the total DC level (DcLevel of the right hand side of equation 13) the by the number of samples in the segment (SampleCount):

$$DcLevel=DcLevel/SampleCount \quad \text{(Equation 13)}$$

In operation 912 a first audio sample may be selected again to start the second loop. In operation 914 absolute value of the audio sample (AbsSample) compensated with the DC level may be calculated by taking the absolute value of the audio sample minus the DC level per audio sample:

$$AbsSample=|AudioSample-DcLevel| \quad \text{(Equation 14)}$$

The segment value (SegmentAverage of the left hand side of equation 15, SegmentAverage of the right hand side of equation 15 is the sum of the previous iteration) may be calculated by summing the absolute value of the audio samples (AbsSample):

$$SegmentAverage=SegmentAverage+AbsSample \quad \text{(Equation 15)}$$

In operation 916 the maximum absolute sample value of all samples of the Segment is stored, for example in a variable SegmentMaximum. In operation 918 it is checked whether the iteration through all the samples has finished, e.g., whether it is the last sample of the segment. If not, the next sample is retrieved in operation 920 to continue iteration in operation 914 through all Audio Samples of the segment. If there are no more samples in the segment, the method proceeds to operation 922. In operation 922 the segment value (SegmentAverage of the right hand side of equation 16) is calculated by dividing the segment value of operation 914 (SegmentAverage of the left hand side of equation 16) by the number of samples in the segment (SampleCount):

$$SegmentAverage=SegmentAverage/SampleCount \quad \text{(Equation 16)}$$

In operation 924 the method terminates and returns the maximum sample value and the average sample value of the segment.

Figure 10A:
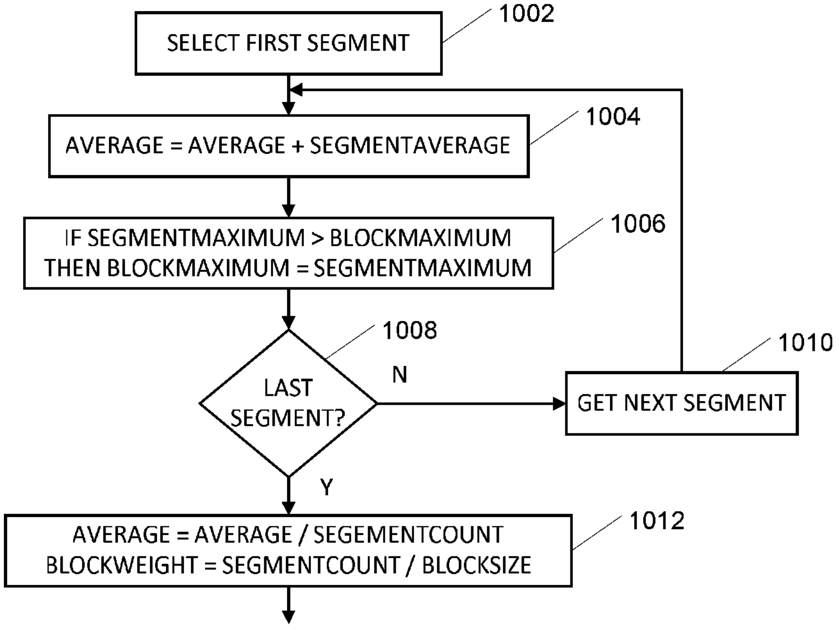
FIGS. 10A, 10B and 10C include a flowchart illustration of a method for audio block processing according to embodiments of the invention.
Figure 10B:
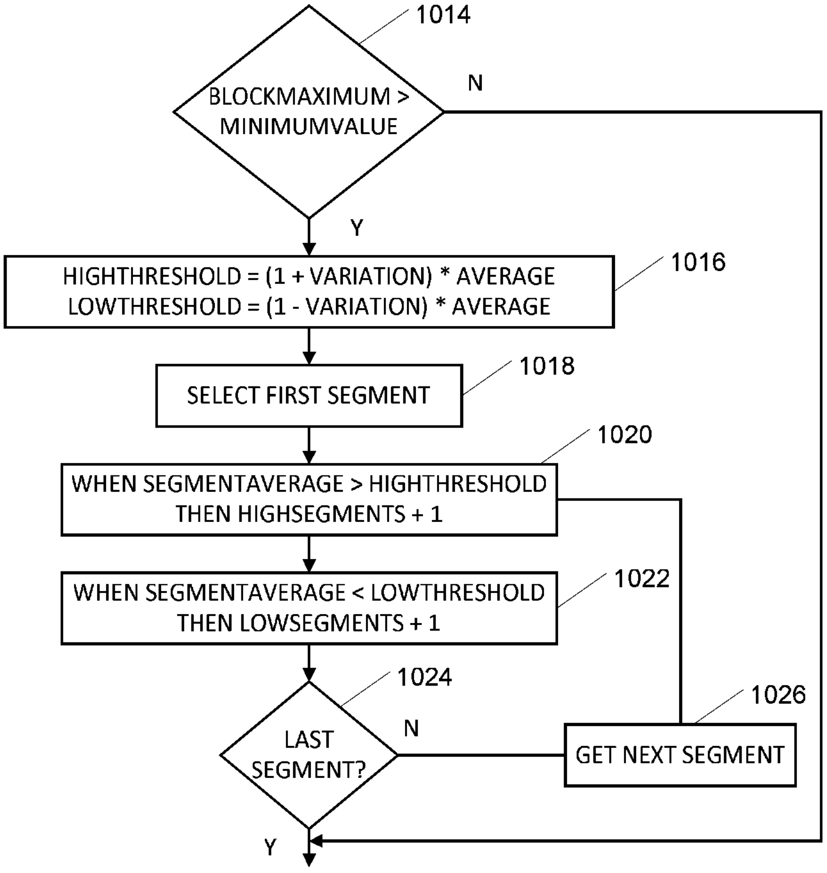
Figure 10C:
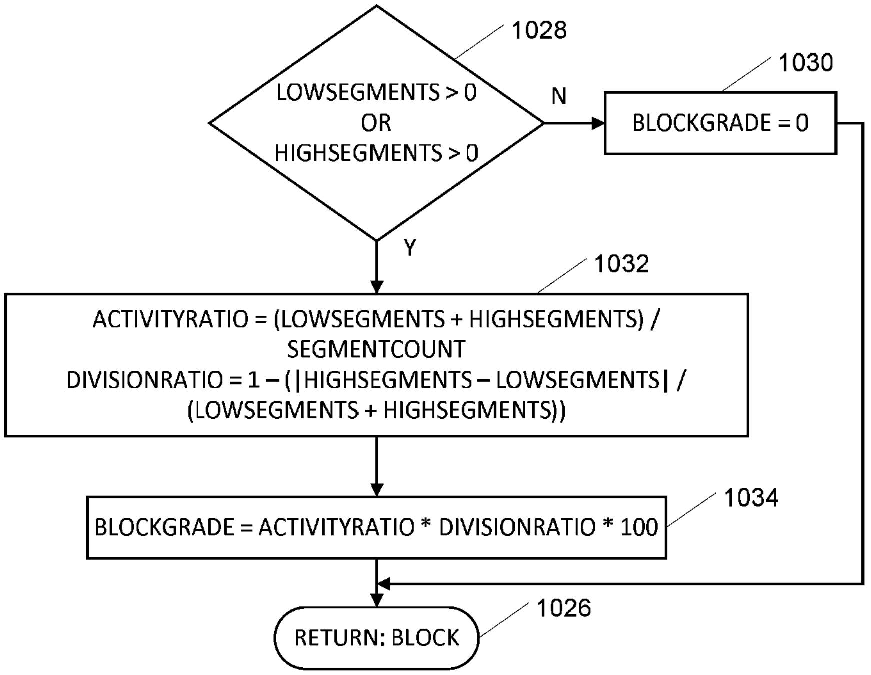

Reference is now made to FIGS. 10A, 10B and 10C which are a flowchart illustration of a method for audio block processing according to embodiments of the invention. In the implementation presented in FIGS. 10A, 10B and 10C a fixed amount of segments may be processed as a block, including calculation of the block grade and weight (indicating the fraction from a full Block).

In a first loop of the method (operations 1004, 1006, 1008 and 1010), the audio segments are iterated or scanned to determine the sum of the segment averages. In operation 1002 a first audio segment may be selected for processing. In operation 1004 the sum of the segment averages may be calculated by:

$$Average=Average+SegmentAverage \quad \text{(Equation 17)}$$

Where Average of the left hand side of equation 17 is the current sum of the segment averages, Average of the right hand side of equation 17 is the sum of the segment averages of the previous iteration and SegmentAverage is the average of the current segment. In operation 1006 the maximal value of SegmentMaximum (found in operation 916 of FIG. 9) may be stored in a variable BlockMaximum. In operation 1008 it may checked whether the iteration through all the segments has finished, e.g., whether it is the last segment of the block If not, the next segment is retrieved in operation 1010 to continue iteration in operation 1004 through all segments of the block. If there are no more segments in the block, the method proceeds to operation 1012. In operation 1012 the block average (Average in the left hand side of equation 18) may be calculated by dividing the sum of the segment averages (Average in the right hand side of the equation 18) the by the number of segments in the block (SegmentCount):

$$Average=Average/SegmentCount \quad \text{(Equation 18)}$$

The block weight (BlockWeight) may be calculated by dividing the number of segments in the block (SegmentCount) by the number of segments that makes a full part (BLOCKSIZE):

$$BlockWeight=SegmentCount/BLOCKSIZE \quad \text{(Equation 19)}$$

The block weight is the fraction of the number of segments that are processed, from a full block The block weight is expected to equal one for a full block In operation 1014 it is checked whether BlockMaximum is above a predetermined threshold (MINIMUMVALUE). If BlockMaximum is above MINIMUMVALUE the method continuous to operation 1016. If BlockMaximum is not above a predetermined threshold (MINIMUMVALUE), the method jumps to operation 1028. Blocks in which all samples have values below MINIMUMVALUE may be suspected as including background noise. Thus, these blocks may not be analyzed and their speech grade may be set to 0. This may filter for background noise.

In operation 1016 an upper detection boundary (HighThreshold) and lower detection boundary (LowThreshold) may be determined using the parameter variation similarly to equation 3:

$$HighThreshold=(1+VARIATION)*Average$$

$$LowThreshold=(1-VARIATION)*Average \quad \text{(Equation 20)}$$

In a second loop of the method (operations 1020, 1022, 1024 and 1026), the audio segments are iterated or scanned to determine the number of segments that have segment value (SegmentAverage) that is above upper detection boundary (HighThreshold) and the number of segments that have segment value (SegmentAverage) that is below the lower detection boundary (LowThreshold). In operation 1018 a first audio segment may be selected for processing. In operation 1020 the number of segments that have segment value (SegmentAverage) that is above the upper detection boundary (HighThreshold) are counted into variable HighSegments. In operation 1022 the number of segments that have segment value (SegmentAverage) that is below the lower detection boundary (LowThreshold) are counted into variable LowSegments. In operation 1024 it may checked whether the iteration through all the segments has finished, e.g., whether it is the last segment of the block. If not, the next segment is retrieved in operation 1026 to continue iteration in operation 1020 through all segments of the block If there are no more segments in the block, the method proceeds to operation 1028.

In operation 1028 it is checked whether there were any segments above the upper detection boundary or below the lower detection boundary. If there are no segments above the upper detection boundary or below the lower detection boundary the method continuous to operation 1030 where the block grade of the block is determined to be zero. If there were segments above the upper detection boundary or below the lower detection boundary, then the method continuous to operation 1032 in which the activity ratio and the division ratio may be calculated according to equations 4 and 5, respectively. In operation 1034 the block grade is calculated according to equation 6, where the proportion factor equals 100 to get a block grade between 0 and 100 for full blocks. In operation 1026 the method returns the block grade and weight of the block.

Figure 11:
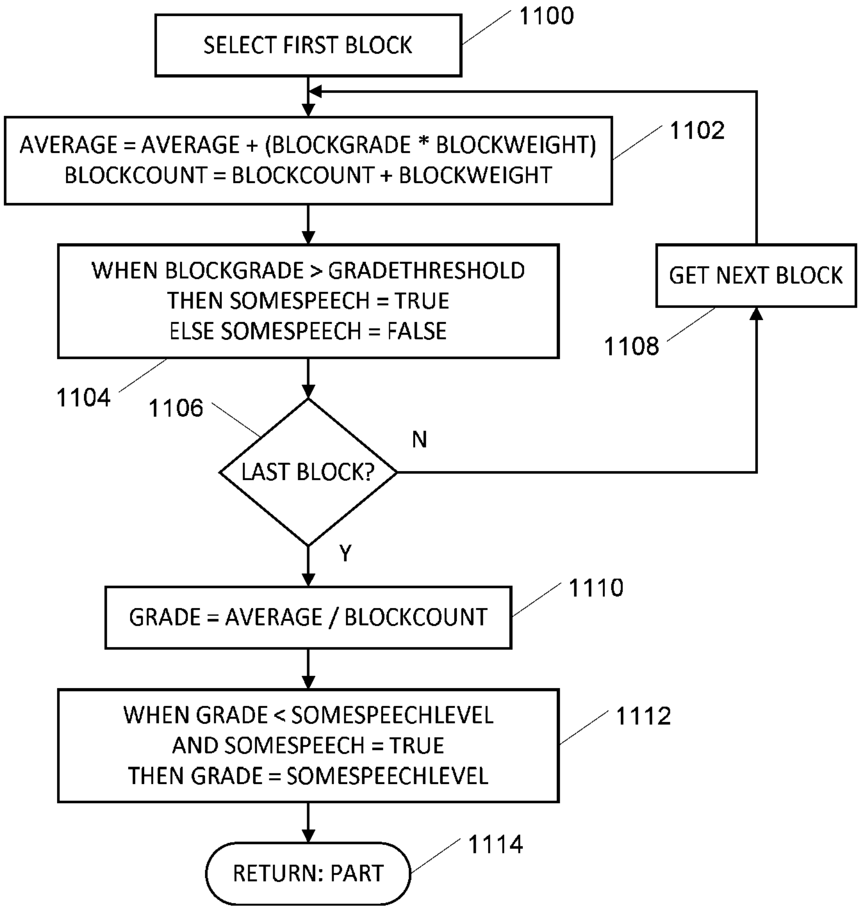
FIG. 11 is a flowchart illustration of a method for audio part processing according to embodiments of the invention.

Reference is now made to FIG. 11 which is a flowchart illustration of a method for audio part processing according to embodiments of the invention. The method may process a fixed amount of blocks as a part. The method may include determining the audio grade for the part.

In a first loop of the method (operations 1102, 1104, 1106 and 1108), the audio blocks are iterated or scanned to determine the sum of the block values. In operation 1102 a first block value may be selected for processing. In operation 1104 the sum of the block grades may be calculated by:

$$\text{Average}=\text{Average}+(\text{BlockGrade}*\text{BlockWeight}) \quad \text{(Equation 21)}$$

Where Average of the left hand side of equation 21 is the current sum of the block grades, Average of the right hand side of equation 21 is the sum of the block grades of the previous iteration and BlockGrade and BlockWeight are the block grade and block weight of the current block, respectively. In the following equation, the total amount of blocks (BlockCount), including partial blocks is calculated:

$$\text{BlockCount}=\text{BlockCount}+\text{BlockWeight} \quad \text{(Equation 22)}$$

Where BlockCount in the left hand side of equation 22 is the number blocks, BlockCount in the right hand side of equation 22 is the number of blocks in the previous iteration. In operation 1104 it may be checked whether the block grade is above a predetermined threshold (GRADETHRESHOLD). If the speech grade of the part is above GRADETHRESHOLD than a marker (SOMESPEECH) is assigned to the audio part. In operation 1106 it may be checked whether the iteration through all the blocks has finished, e.g., whether it is the last block of the part. If not, the next block is retrieved in operation 1108 to continue iteration in operation 1102 through all blocks of the part. If there are no more blocks in the part, the method proceeds to operation 1110. In operation 1110 the part speech grade (Grade) may be calculated by dividing the sum of the block grades (Average of the right hand side of the equation 23) the by the number of blocks in the part (BlockCount):

$$\text{Grade}=\text{Average}/\text{BlockCount} \quad \text{(Equation 23)}$$

In operation 1112 a predetermined minimum value (SOMESPEECHLEVEL) may be given to the part speech grade if the speech grade of at least one block of the part is above a predetermined threshold (GRADETHRESHOLD) as checked in operation 1104, and the speech grade of the entire part is below a second predetermined threshold (in this case SOMESPEECHLEVEL). The first and second thresholds may be equal or different. Operation 1104 may enable to differentiate between long streams with only silence and long streams with some speech but mostly silence. In operation 1114 the method terminates and returns the speech grade of the part.

Figure 12:
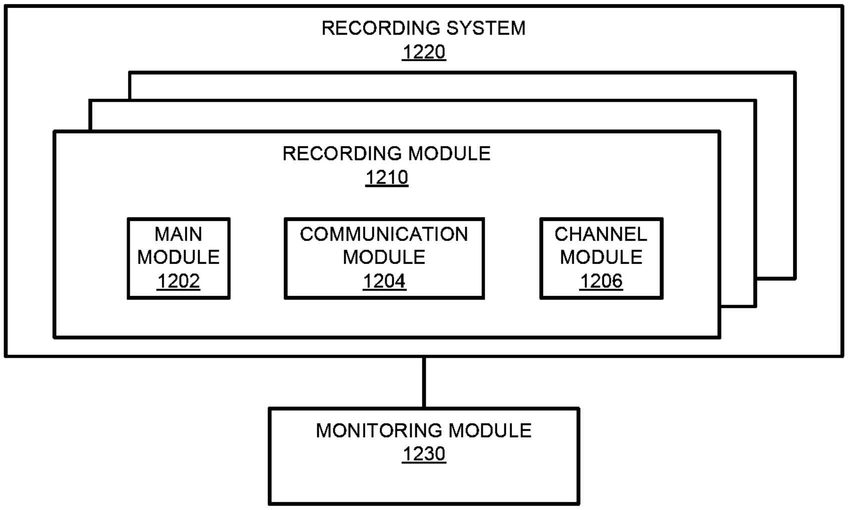
FIG. 12 is a high-level diagram of an exemplary recording system according to embodiments of the invention.

Reference is made to FIG. 12 depicting a high-level diagram of an exemplary recording system 1220 according to embodiments of the invention. According to embodiments of the invention, recording system 1220 may include one or more recording modules 1210. A recording module 1210 may include main module 1202, communication module 1204 and channel module 1206. A monitoring module may be connected to recording system 1220. It should be noted that this exemplary system is a non-limiting example of implementation of speech recognition according to embodiments of the invention. Speech recognition according to embodiments of the invention may be implemented in other systems as well, or in recording systems with different architectures.

Recording system 1220 may offer the possibility to link multiple Recording modules 1210, for example, to become an enterprise-wide recording platform with centralized user administration and call playback. Implementing a speech detector according to embodiments of the invention as disclosed herein may enable recording system 1220 to search on stream voice grade values, to display the stream voice grades of each recording at replay or to use the stream voice grade for any other functionality as may be required according to system design.

Recording system 1220 may include a plurality of recording modules 1210. Recording modules 1210 may be a recording platform which main functionalities include for example:

- Capturing and storing the speech of e.g., phone calls.
- Capturing and storing the metadata of the phone calls, e.g., start/stop time, calling/called party, etc. of the phone calls.
- Search and replay—All recordings may be made available for playback through a web application.
- User management—Which user has which rights for configuration, search and replay
- Archiving—Archive recorded calls to various archive media e.g., a storage system such as the EMC²® system, network location, removable media.
- Monitoring and Configuration—Monitoring the system status e.g., alarms, recording status, etc., and configuration of recording functionality, user management, etc.

Recording modules 1210 may include for example channel module 1206, communication module 1204 and main module 1202, which may be deployed on the same system or on separate systems. Main module 1202, may handle storage, archiving, web (graphical user interface (GUI) host, user management and search and replay. Communication module 1204 may handle the connection with the different private-branch-exchange (PBX's). The main tasks of communication module 1204 may include for example:

- Connect to the different PBX's on their recording interfaces.
- Monitor the different recording targets (phones, extensions, users).
- Register calls and their metadata.
- Reserve channels for recording targets/calls.

The recording may be created first by channel module 1206. Channel module 1206 may use speech detection according to embodiments of the invention disclosed herein. The channel mode will be discussed with relation to FIG. 13. The main tasks of channel module 1206 may include for example:

- Capture recording streams and write them as an audio file to storage.
- Transcode recording streams to a standardized format.
- Decrypt recording streams
- Encrypt captured recordings.
- Transfer audio files and their metadata to the main module.

Monitoring module 1230 may monitor the recordings performed by recording system 1220. Monitoring module 1230 may use the audio speech grade to provide some or all of the functionalities described hereinbelow.

Recording compliance monitoring—some recording applications, e.g., Trading Floor market, requires real-time visibility, reporting and open access to recording data to reduce the risk of non-compliance. Monitoring module 1230 may visualize the health of recording system 1220 and monitor recording compliance by track exceptions and query who and what is being recorded where. Monitoring module 1230 may receive voice grades of the recorded audio streams calculated according to embodiments of the invention, for example, by channel module 1206. Monitoring module 1230 may use the voice grades of the recorded audio streams to determine the overall health of recording system 1220. For example, monitoring module 1230 may determine the average audio speech grade per user, determine the last Voice Metric per user, provide reports regarding the audio signal speech grade over time for various channels or users, etc.

According to embodiments of the invention, monitoring module 1230 use advanced applications to perform cross-channel interaction analytics across all recordings, for example, for trading floor communications recording applications. This may enable automatic analysis of the content of interactions and categorization based on the content of the recording and on the financial institution's own risk-based policy and procedures. Hence, monitoring module 1230 may determine the need for transcription of recordings (speech-to-text) based on the presence of speech e.g., based on the audio signal speech grade. Transcribing speech to text is a very processing-intensive procedure, so when the audio signal speech grade is below a predetermined threshold, it may be concluded that there is no speech in a recording, and thus transcription is not required. This saves a lot of unnecessary processing.

In some applications, e.g., in systems that record telephone conversations, monitoring module 1230 may use the speech grade to monitor the overall performance of recording modules 1210 and recording system 1220. For example, in systems that record telephone conversations, most recordings should contain speech. Thus, it may be expected that a well-functioning recording system would mostly record audio signals that contain speech. Recording modules 1210 may be configured to record a plurality of audio signals from a plurality of channels, and an audio signal speech grade may be calculated for each of the plurality of audio signals of the plurality of channels. The speech grades of the audio signals recorded by recording system 1220 may be monitored, and various statistics may be derived in order to get an overview of the system performance. For example, the percentage of channels that record audio signals that have a speech grade that is above a predetermined threshold, out of the channels that record audio signals, may be monitored in any given time or over a time window. Similarly, the percentage of audio signals that have a voice grade that is above a predetermined threshold may be monitored for each recording channel. These statistics may be reported and various criterions may be defined to determine the overall performance of recording system 1220. For example, it may be defined that recording system 1220 should have 80% of its calls above a speech grade of at least 60, it may be defined that each recorded channel or telephone should have 80% of its calls with a speech grade above 60, etc.

In some applications recording system 1220 may provide redundancy, e.g., recording system 1220 may include two or more separate recording modules 1210 for recording the same telephones. For example, a first recording module 1210 may be configured to record a plurality of audio signals of a plurality of calls from a plurality of channels and a second recording module 1210 may be configured to record the same audio signals. Thus, each call on a recorded telephone may be recorded at least twice. An audio signal speech grade may be calculated for each of the plurality of audio signals of the plurality of channels for each of recording modules 1210. When all redundant recording systems perform well, the speech grade of each recording of a single call should be the same among the redundant recording modules 1210. Thus, the audio signal speech grades of the same call may be compared to each other to monitor the performance of recording modules 1210 and recording system 1220.

Figure 13:
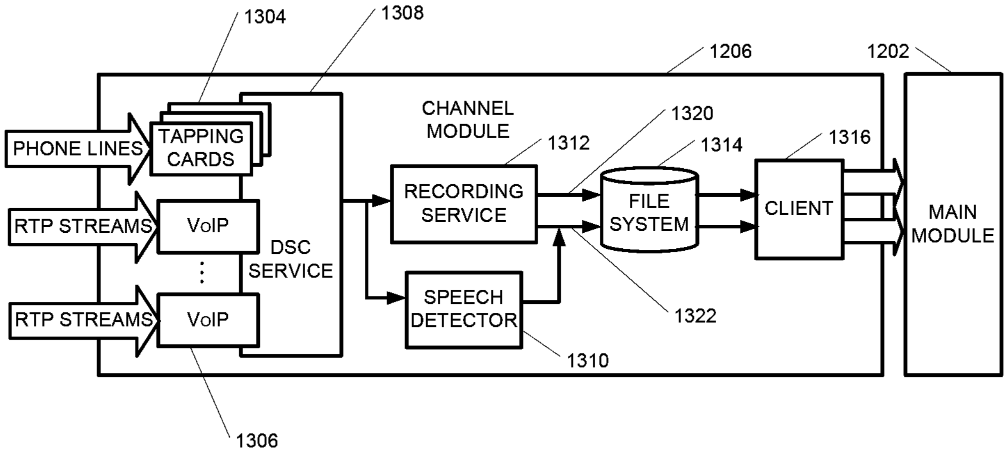
FIG. 13 is a high-level diagram of an exemplary channel module according to embodiments of the invention.

Reference is made to FIG. 13 depicting a high-level diagram of an exemplary channel module 1206 according to embodiments of the invention. It should be noted that this exemplary system is a non-limiting example of implementation of speech recognition according to embodiments of the invention. Speech recognition according to embodiments of the invention may be implemented in other systems as well, or in recording systems with different architectures.

According to embodiments of the invention, channel module 1206 may include tapping cards 1304 that may receive phone line signals. Tapping cards 1304 that may translate the phone line signals to bit streams, decode the specific line protocol (each PBX may have its own line protocol for phone lines) to audio streams and metadata, decode the audio streams and provide the decoded audio stream and metadata to digital speech converter (DSC) service 1308 in standardized format Channel module 1206 may further include VoIP Firmware that may receive Real-time Transport Protocol (RTP) streams. Channel module 1206 may capture the RTP streams, decrypt and decode the streams and provide the decoded audio stream and metadata to DSC Service 1308 in standardized format.

DSC Service 1308 may receive audio streams and metadata from tapping cards 1304 and channel module 1206. DSC Service 1308 may offer single application programming interface (API) for multiple clients to access recording streams and metadata of all cards and firmware. Recording service 1312 may retrieve all recording streams from DSC service 1308, encode e.g., compress, and encrypt recording streams, store recordings, e.g., as WAV files 1320, and accompanying metadata files 1322 on file system 1314 which may be a storage device. Client 1316 may retrieve recordings from file system 1314, transfer the recordings to main module 1202 and insert recording entries into a database of main module 1202 with accompanying metadata.

Speech detector 1310 may include implementation of the method for determining an amount of speech in an audio signal according to embodiments of the invention. Recording service 1312 may have raw recording streams available in a standardized format. For each block of audio processed by recording service 1312 speech detector 1310 may activate the method for determining an amount of speech in an audio steam in real-time according to embodiments of the invention, for example, as described with relation to FIG. 6. Additionally or alternatively, the method for calculating the speech grade of the audio stream according to some embodiments of the invention as described with relation to FIGS. 8A, 8B may be implemented when recording service 1312 has stopped recording on a channel, for calculating audio speech grade for that channel The calculated speech grade may added to a metadata file accompanying the WAV file containing the recorded audio. Since recording service 1312 receives audio streams in standardized format from a variety of sources (phone lines and RTP streams) the method for determining an amount of speech in an audio steam may be available as a generic feature for audio from all sources.

Speech detector 1310 may further provide the following features for recording module 1210: search on speech grade values, display the speech grades of each recording at replay, provide an alarm when a configurable consecutive amount of recordings on a single recording channel contain a speech grade that is lower than the configured minimum, provide an alarm when for a predetermined amount of time of the audio signal speech grade is lower than a predetermined minimum, determine the need for archiving a recording in file system 1314, based on the speech grade. For example, a configurable threshold may be used to determine whether an audio stream contains speech or not and the audio stream may be stored in file system 1314 if the speech grade is above the configurable threshold.

Figure 14:
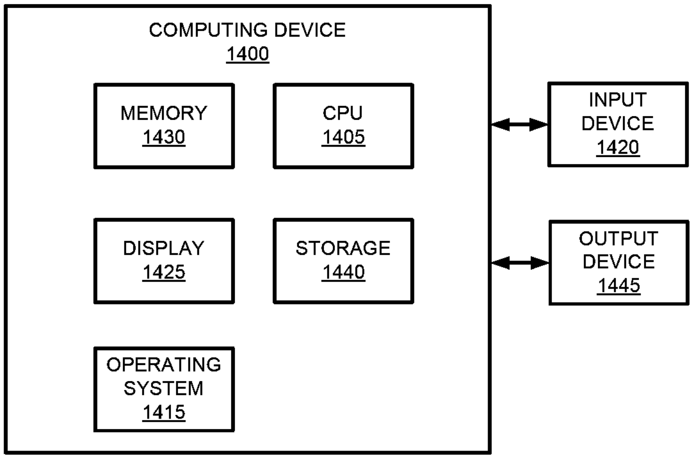
FIG. 14 is a high level block diagram of an exemplary computing device according to embodiments of the invention.

Reference is made to FIG. 14, showing high level block diagram of an exemplary computing device according to embodiments of the invention. According to embodiments of the invention, recording system 1220, or any of its sub modules e.g., recording module 1210, main module 1202, communication module 1204 and channel module 1206, may comprise all or some of the components comprised in computing device 1400 as shown and described herein. Additionally, any of the sub modules of communication module 1204 as described with relation for FIG. 13, e.g., recording service and speech detector 1310, may comprise all or some of the components comprised in computing device 1400 as shown and described herein. According to embodiments of the invention, computing device 1400 may include a memory 1430, processor, e.g., central processing unit processor (CPU) 1405, monitor or display 1425, storage device 1440, an operating system 1415 and input device(s) 1420 and output device(s) 1445.

According to embodiments of the invention, storage device 1440 may be any suitable storage device, e.g., a hard disk or a universal serial bus (USB) storage device, input devices 1420 may include a mouse, a keyboard or any suitable input devices and output devices 1445 may include one or more displays, speakers and/or any other suitable output devices. According to embodiments of the invention, various programs, applications, scripts or any executable code may be loaded into memory 1430 and may further be executed by controller 1405. For example, as shown, speech detector 1310 may be loaded into memory 1430 and may be executed by processor 1405 under operating system 1415. Processor 1405 may be configured to execute commands included in a program, algorithm or code stored in memory 1430. Processor 1405 may be any computation device that is configured to execute various operations included in embodiments disclosed herein for example by executing code or software stored in memory. Memory 1430 may be a non-transitory computer-readable storage medium that may store thereon instructions that when executed by processor 1405, cause processor 1405 to perform operations and/or methods, for example, as disclosed herein.

Some embodiments of the invention may be implemented in software for execution by a processor-based system, for example, speech detector 1310 and the embodiments described with relation to FIGS. 2, 3, 6, 7, 8A, 8*b*, 9, 10A, 10A, 10A and 11, and/or modules, detectors, services and processes described herein. For example, embodiments of the invention may be implemented in code or software and may be stored on a non-transitory storage medium having stored thereon instructions which, when executed by a processor (e.g., processor 1405), cause the processor to perform methods as discussed herein, and can be used to program a system to perform the instructions. The non-transitory storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices. Other implementations of embodiments of the invention may comprise dedicated, custom, custom made or off the shelf hardware, firmware or a combination thereof.

Embodiments of the invention may be realized by a system that may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A computer implemented method for determining an amount of speech in an audio signal, the method comprising:

obtaining the audio signal, the audio signal having an amplitude indicative of a volume level of sound;

for each one of a plurality of segments of the audio signal, wherein the segments are grouped into blocks, calculating, by a processor, a segment value indicative of an amplitude of the audio signal of the segment;

for each one of the blocks calculating, by the processor, a block value indicative of the amplitude of the audio signal of the block, wherein the block value is based on the segment values within the block;

calculating, by the processor, an audio signal speech grade based on the segment values' relationship to values derived from the block values, wherein the audio signal speech grade is indicative of the amount of speech in the audio signal;

determining, by the processor, whether the audio signal contains speech based on the audio signal speech grade; and only if the audio signal contains speech, performing one of: transcription of the audio signal by the processor; real time word detection on the audio signal by the processor; emotion analysis on the audio signal by the processor; and compression of the audio signal by the processor.

2. The method of claim 1, wherein the length of each of the segments is in a range of 5-40 milliseconds and wherein the size of each of the blocks is in the range of 40-60segments.

3. The method of claim 1, wherein calculating the segment value comprises averaging an absolute value of the audio signal of the respective segment and calculating the block value comprises averaging the segment values of segments associated with the respective block.

4. The method of claim 1, wherein calculating the audio signal speech grade comprises:

calculating block speech grades by:

determining an upper detection boundary and a lower detection boundary relative to the block value;

counting a number of segments that have segment value that is above the upper detection boundary (HighSegments);

counting a number of segments that have segment value that is below the lower detection boundary (LowSegments);

calculating an activity ratio by:

$$\text{activity ratio} = \frac{LowSegments + HighSegments}{\text{total amount of segments in the block}}; \text{ and}$$

calculating a division ratio by:

$$Division\ ratio = 1 - \frac{|HighSegments - LowSegments|}{HighSegments + LowSegments};$$

wherein the block speech grade of a block is proportional to the activity ratio times the division ratio of the respective block; and, calculating the audio signal speech grade by averaging the block speech grades.

5. The method of claim 4, comprising:

assigning a marker to the audio signal if a block speech grade of at least one block of the audio signal is above a predetermined threshold.

6. The method of claim 5, wherein the marker is a predetermined minimum value given to the audio signal speech grade.

7. The method of claim 1, comprising performing at least one of:

providing an alarm if for a predetermined amount of time of the audio signal speech grade is lower than a predetermined minimum; and providing reports regarding the audio signal speech grade over time.

8. The method of claim 1, comprising:

monitoring the performance of a recording system based on the audio signal speech grade.

9. The method of claim 1, wherein the method for determining the amount of speech in the audio signal is performed in real-time.

10. The method of claim 1, comprising:

storing the audio signal in a file system only if the audio signal contains speech.

11. The method of claim 1, comprising:

monitoring health of a recording system based on the audio signal speech grade, and visualizing the health of the recording system.

12. A device for determining an amount of speech in an audio signal, the device comprising:

a memory; and a processor configured to:

for each one of a plurality of segments of the audio signal, wherein the segments are grouped into blocks, calculate a segment value indicative of an amplitude of the audio signal of the segment;

for each one of the blocks calculate a block value indicative of the amplitude of the audio signal of the block, wherein the block value is based on the segment values within the block;

calculate an audio signal speech grade based on the segment values' relationship to values derived from the block values, wherein the audio signal speech grade is indicative of the amount of speech in the audio signal;

determine, whether the audio signal contains speech based on the audio signal speech grade; and only if the audio signal contains speech, perform one of: transcription of the audio signal; real time word detection on the audio signal; emotion analysis on the audio signal; and compression of the audio signal.

13. The device of claim 12, wherein the length of each of the segments is in a range of 5-40 milliseconds, and wherein the size of each of the blocks is in the range of 40-60 segments.

14. The device of claim 12, wherein the processor is configured to calculate the segment value by averaging an absolute value of the audio signal of the respective segment and to calculate the block value by averaging the segment values of segments associated with the respective block.

15. The device of claim 12, wherein the processor is configured to calculate the audio signal speech grade by:

calculating block speech grades by:

determining an upper detection boundary and a lower detection boundary relative to the block value;

counting a number of segments that have segment value that is above the upper detection boundary (HighSegments);

counting a number of segments that have segment value that is below the lower detection boundary (LowSegments);

calculating an activity ratio by:

$$\text{activity ratio} = \frac{LowSegments + HighSegments}{\text{total amount of segments in the block}}; \text{ and}$$

calculating a division ratio by:

$$Division\ ratio = 1 - \frac{|HighSegments - LowSegments|}{HighSegments + LowSegments};$$

wherein the block speech grade of a block is proportional to the activity ratio times the division ratio of the respective block; and, calculating the audio signal speech grade by averaging the block speech grades.

16. The device of claim 15, wherein the processor is configured to:

assign a predetermined minimum value to the audio signal speech grade if a block speech grade of at least one block of the audio signal is above a predetermined threshold.

17. The device of claim 12, comprising:

a storage device;

wherein the processor is configured to:

determine whether to store the audio signal in the storage device based on the audio signal speech grade.

18. The device of claim 12, comprising:

a recording module configured to record a plurality of audio signals from a plurality of channels;

wherein the processor is configured to:

calculate an audio signal speech grade for each of the plurality of audio signals of the plurality of channels; and monitor the performance of the recording system based on the audio signal speech grades.

19. The device of claim 10, wherein the processor is configured to determine the amount of speech in the audio signal in real-time.

20. The device of claim 10, comprising:

a first recording module configured to record a plurality of audio signals of a plurality of calls from a plurality of channels;

a second recording module configured to record the same audio signals;

wherein the processor is configured to:

calculate an audio signal speech grade for each of the plurality of audio signals of the plurality of channels for each of the recording modules; and compare the speech grades of audio signals of the same calls as recorded by the first and the second recording modules; and monitor the performance of the recording modules based on the comparison.

21. A non-transitory storage medium having stored thereon instructions that, when executed by a processor, cause the processor to perform a method comprising:

for each one of a plurality of segments of the audio signal, wherein the segments are grouped into blocks, calculating a segment value indicative of an amplitude of the audio signal of the segment;

for each one of the blocks calculating a block value indicative of the amplitude of the audio signal of the block, wherein the block value is based on the segment values within the block;

calculating an audio signal speech grade based on the segment values' relationship to values derived from the block values, wherein the audio signal speech grade is indicative of the amount of speech in the audio signal;

determining, by the processor, whether the audio signal contains speech based on the audio signal speech grade; and only if the audio signal contains speech, performing one of: transcription of the audio signal by the processor; real time word detection on the audio signal by the processor; emotion analysis on the audio signal by the processor; and compression of the audio signal by the processor.

22. The non-transitory storage medium of claim 21, wherein calculating the audio signal speech grade comprises:

calculating block speech grades by:

determining an upper detection boundary and a lower detection boundary relative to the block value;

counting a number of segments, HighSegments, that have segment value that is above the upper detection boundary;

counting a number of segments, LowSegments, that have segment value that is below the lower detection boundary;

calculating an activity ratio by:

$$\text{activity ratio} = \frac{LowSegments + HighSegments}{\text{total amount of segments in the block}};$$

and calculating a division ratio by:

$$\text{Division ratio} = 1 - \frac{|HighSegments - LowSegments|}{HighSegments + LowSegments};$$

wherein the block speech grade of a block is proportional to the activity ratio times the division ratio of the respective block; and calculating the audio signal speech grade by averaging the block speech grades.

* * * * *